US 6,563,657 B1

(12) United States Patent
Serrano et al.

(10) Patent No.: US 6,563,657 B1
(45) Date of Patent: May 13, 2003

(54) MULTIPLE AND RECONFIGURABLE DATA ACCESS AND STORAGE DEVICE USING MULTIPLE ACTUATORS

(75) Inventors: Louis Joseph Serrano, San Jose, CA (US); Mantle Man-Hon Yu, San Jose, CA (US); Kirk Barrows Price, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/676,604

(22) Filed: Sep. 29, 2000

(51) Int. Cl.⁷ .................................................. G11B 5/09

(52) U.S. Cl. ............................ 360/48; 360/8; 360/61; 360/69

(58) Field of Search ........................ 360/246.7, 246.6, 360/61, 63, 69, 8, 48, 78, 12; 711/111, 112

(56) References Cited

U.S. PATENT DOCUMENTS

| | | | |
|---|---|---|---|
| 4,967,293 A | * 10/1990 | Aruga et al. ............ | 360/246.7 |
| 5,223,993 A | 6/1993 | Squires et al. | |
| 5,274,507 A | * 12/1993 | Lee ......................... | 360/246.6 |
| 5,293,282 A | 3/1994 | Squires et al. | |
| 5,341,351 A | 8/1994 | Ng | |
| 5,343,345 A | 8/1994 | Gilovich | |
| 5,343,347 A | 8/1994 | Gilovich | |
| 5,355,486 A | 10/1994 | Cornaby | |
| 5,761,007 A | 6/1998 | Price et al. | |
| 6,057,990 A | * 5/2000 | Gilovich ................. | 360/246.7 |

OTHER PUBLICATIONS

Intellectual Property Network for Business, Nov. 7, 1999, IBM Technical Disclosure Bulletin, "Enhanced Disk Task Sequencing", pp. 1946–1948.
Intellectual Property Network for Business, Nov. 7, 1999, BM Technical Disclosure Bulletin, "Using Dual Actuator Shared Data Direct Access Storage Devices Drives in A Redundant Array", pp. 270–272.
Intellectual Property Network for Business, Nov. 7, 1999, IBM Technical Disclosure Bulletin, Expanded Cylinder Mode for High–End DASD, pp. 135–137.
Intellectual Property Network for Business, Nov. 7, 1999, IBM Technical Disclosure Bulletin, Disk Storage File Actuator Instruct Prioritization Circuitry, pp. 750–>.

* cited by examiner

Primary Examiner—Alan T. Faber
(74) Attorney, Agent, or Firm—Abdy Raissinia; Bracewell & Patterson, L.L.P.

(57) ABSTRACT

A hard disk drive for a computer system has at least two actuators for reading data from or writing data to the disks. The actuators may be configured to support the different methods of data access required of them. For example, if large quantities of sequential data are performed, one operation uses both actuators to increase throughput. However, if mostly random operations are to be performed, then independent usage of the actuators is preferred. These two methods of usage can be supported simultaneously, and can even be dictated by the user. The tracking format of the actuators can be configured such that the next logical track is physically located under a head on a different actuator to improve sequential operation. The actuators also may be utilized in a dual-channel configuration so that data can be written to both actuators at the same time, or read back at the same time to improve throughput. In addition, either of these configurations can be selected on a transfer-by-transfer basis by the user.

12 Claims, 4 Drawing Sheets

MULTIPLE AND RECONFIGURABLE DATA ACCESS AND STORAGE DEVICE USING MULTIPLE ACTUATORS

BACKGROUND OF THE INVENTION

1. Technical Field

The present invention relates in general to an improved data access and storage device, and in particular to an improved direct access and storage device that utilizes multiple actuators. Still more particularly, the present invention relates to a direct access and storage device with multiple actuators that may be operated independently, in parallel, or selectively actuated by the user.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters that are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the head stack assembly. Within most HDDs, one magnetic read/write head or slider is associated with each side of each platter and flies just above or below the platter's surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the disk spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track. The data on the spinning media is then read via a magnetic read sensor (typically magnetoresistive) on the read-write head.

As the storage capacity of DASDs continues to increase, a single disk drive enclosure may encounter many different kinds of applications. For example, a drive may be required to perform a very high throughput sequential operation, or a very high input/output rate random operation. Although there is no present manner of optimizing performance based upon any particular access characteristics, U.S. Pat. No. 5,293,282, discloses a disk drive with multiple actuators. The multiple actuators have multiple heads that read data from and write data to all tracks on the surfaces of the disks. The positioning of each head by respective actuators is controlled by embedded servo information recorded in the data tracks. Utilizing two actuators provides increased data transfer rates and reduced access times with respect to the access times provided by disk drives having a single actuator. However, that disk drive has no mechanism for optimizing the drive's performance for the different types of access characteristics. In order to increase performance while handling the diversity of operations required of modern disk drives, an improved system and method for efficiently utilizing the drives is needed.

SUMMARY OF THE INVENTION

A hard disk drive for a computer system has at least two actuators for reading data from or writing data to the disks. The actuators may be configured to support the different methods of data access required of them. For example, if large quantities of sequential data are performed, one operation uses both actuators to increase throughput. However, if mostly random operations are to be performed, then independent usage of the actuators is preferred. These two methods of usage can be supported simultaneously, and can even be dictated by the user. The tracking format of the actuators can be configured such that the next logical track is physically located under a head on a different actuator to improve sequential operation. The actuators also may be utilized in a dual-channel configuration so that data can be written to both actuators at the same time, or read back at the same time to improve throughput. In addition, either of these go configurations can be selected on a transfer-by-transfer basis by the user.

The foregoing and other objects and advantages of the present invention will be apparent to those skilled in the art, in view of the following detailed description of the preferred embodiment of the present invention, taken in conjunction with the appended claims and the accompanying drawings.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
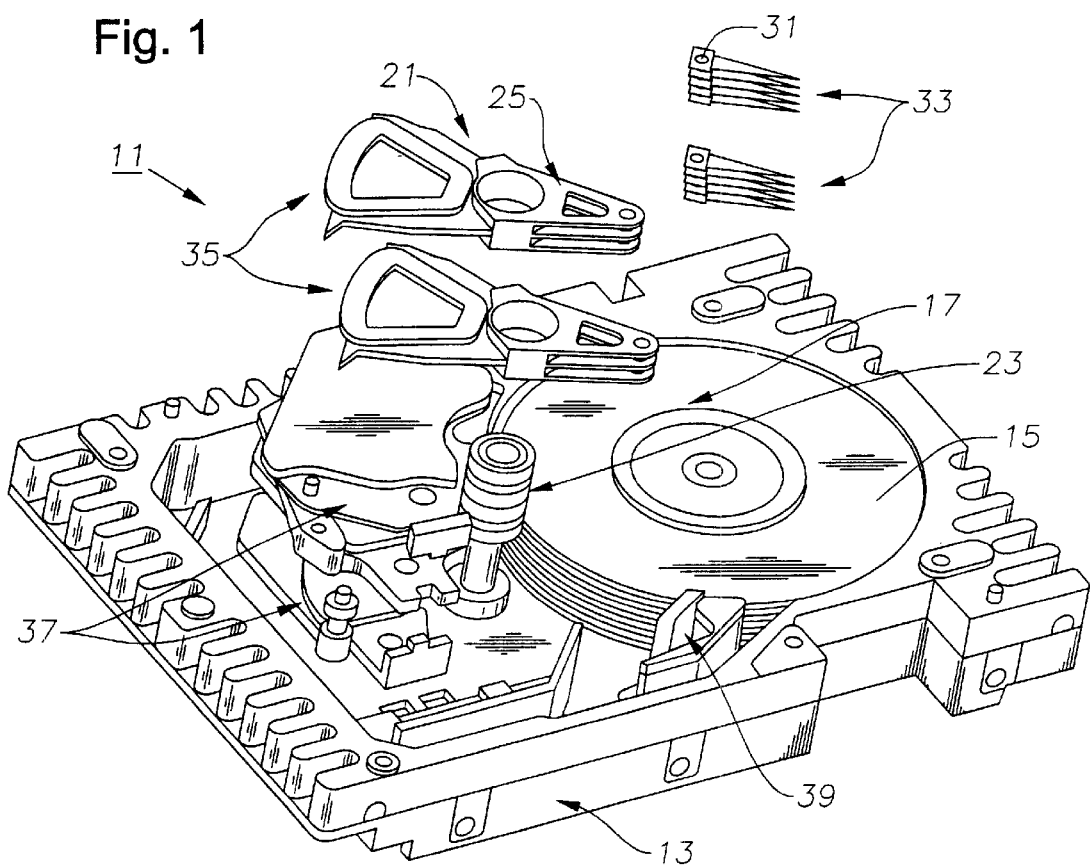
FIG. 1 is an exploded isometric view of a hard disk drive constructed in accordance with the invention.
Figure 2:
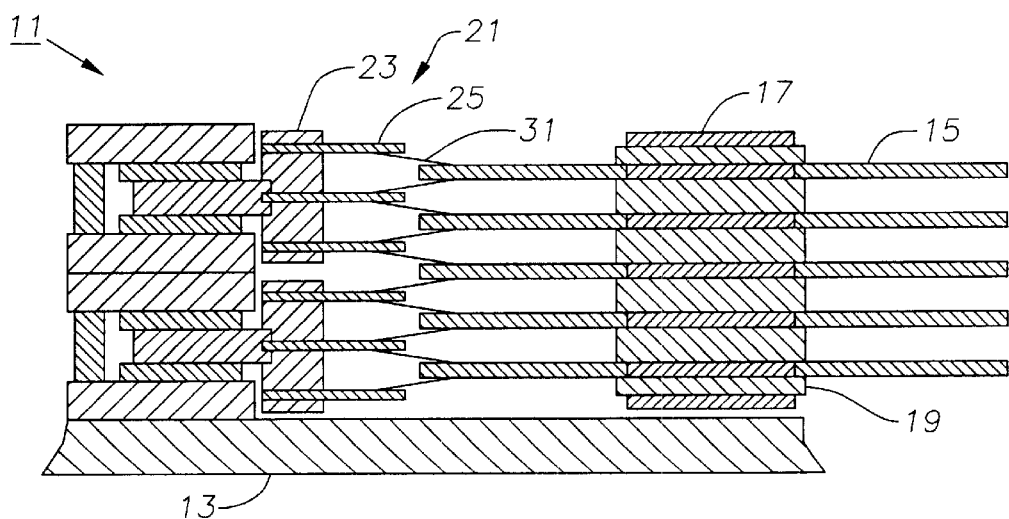
FIG. 2 is a sectional side view of a portion of the hard disk drive of FIG. 1.

Referring to FIGS. 1 and 2, a schematic drawing of an information storage system, such as a direct access and storage device (DASD), comprising a magnetic hard disk file or drive 11 for a computer system is shown. Drive 11 has an outer housing or base 13 containing a plurality of stacked, parallel magnetic disks 15 (four shown) which are closely spaced apart. Disks 15 are rotated in unison about a central drive hub 17 by a spindle motor 19 (FIG. 2) located therebelow.

Drive 11 is also provided with multiple actuators 21 (two shown). In the preferred embodiment, drive 11 has two actuators 21, although it may be provided with three, four, or more actuators 21. Although both actuators 21 are shown mounted to the common shaft of a single pivot cartridge assembly 23, actuators 21 may be independently mounted to base 13 on separate support structures. Each actuator 21 comprises a plurality of stacked, parallel actuator arms 25 (three shown) in the form of a comb that is pivotally mounted to base 13 about pivot cartridge assembly 23. A controller (not shown) is also mounted to base 13 for selectively moving the comb of arms 25 relative to disks 15.

Figure 5:
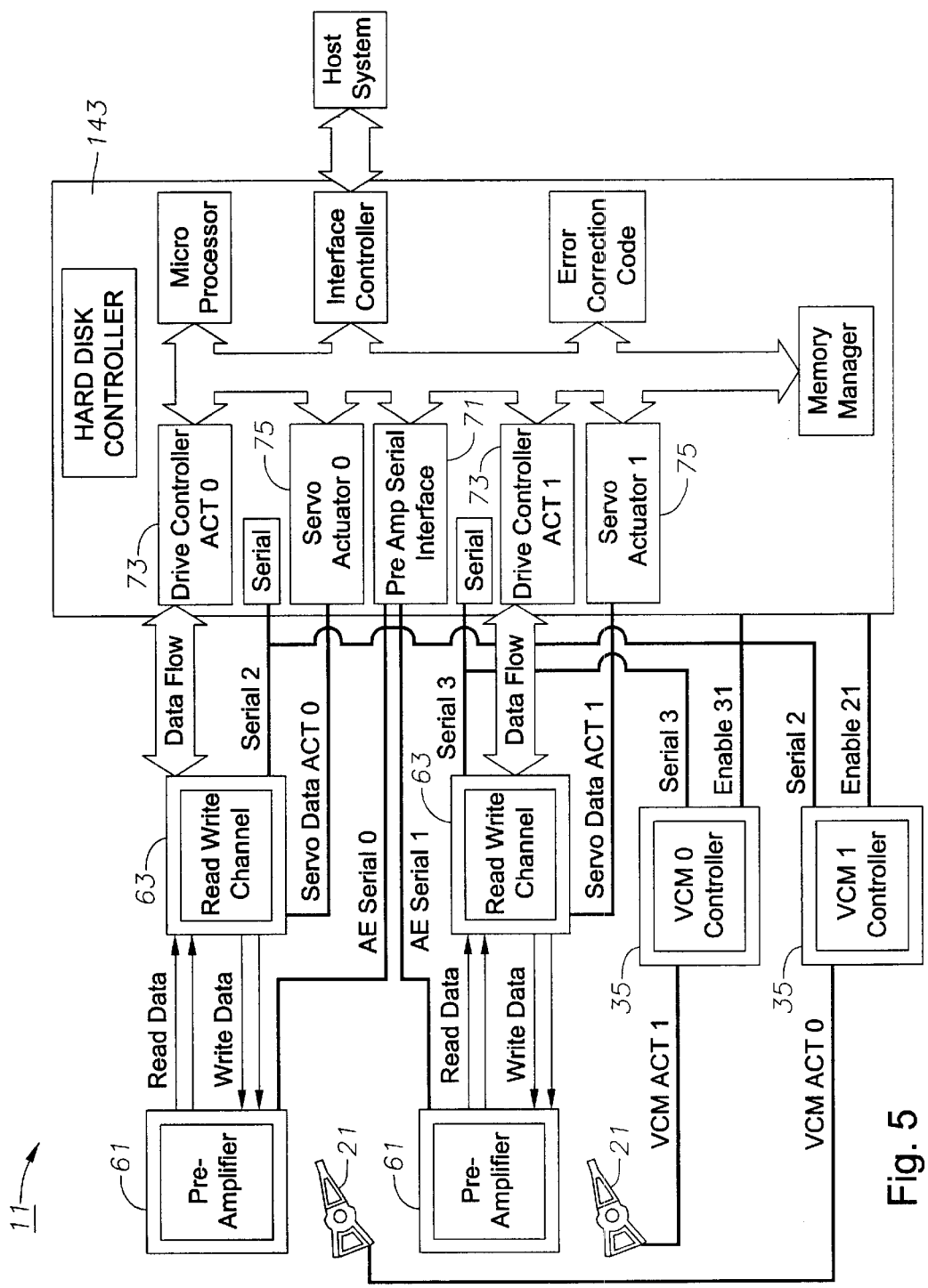
FIG. 5 is a schematic drawing of a hard disk drive having two actuators and is constructed in accordance with the invention.

In the embodiment shown, each arm 25 has extending from it one or two parallel, cantilevered load beams or suspensions 31, and a head gimbal assembly (HGA) 33 having at least one magnetic read/write head secured to each suspension 31 for magnetically reading data from or magnetically writing data to disks 15. Suspensions 31 have a spring-like quality which biases or maintains them in parallel relationship relative to one another. Motor voice coils 35 housed within respective dual magnet assemblies 37 are also mounted to the combs of arms 25 opposite head gimbal assemblies 33. Operation of the respective motor voice coils 35 is independently controlled by controller 143, depicted schematically in FIG. 5. Movement of a motor voice coil 35 moves head gimbal assemblies 33 radially across tracks on the disks 15 until the heads on head gimbal assemblies 33 settle on the target tracks. A ramp 39 is provided near the perimeter of disks 15 for supporting head gimbal assemblies 33 while drive 11 is not in operation. Ramp 39 is not required for the present invention.

The proposed solution of the present invention is to configure the operations of actuators 21 to support the different methods of data access required of them. For example, if large quantities of sequential data are performed, one operation uses both actuators 21 in parallel to increase throughput. However, if mostly random operations are to be performed, then independent usage of the actuators is preferred. These two methods of usage can be supported simultaneously, and can even be dictated on a selected basis by the user.

Figure 3:
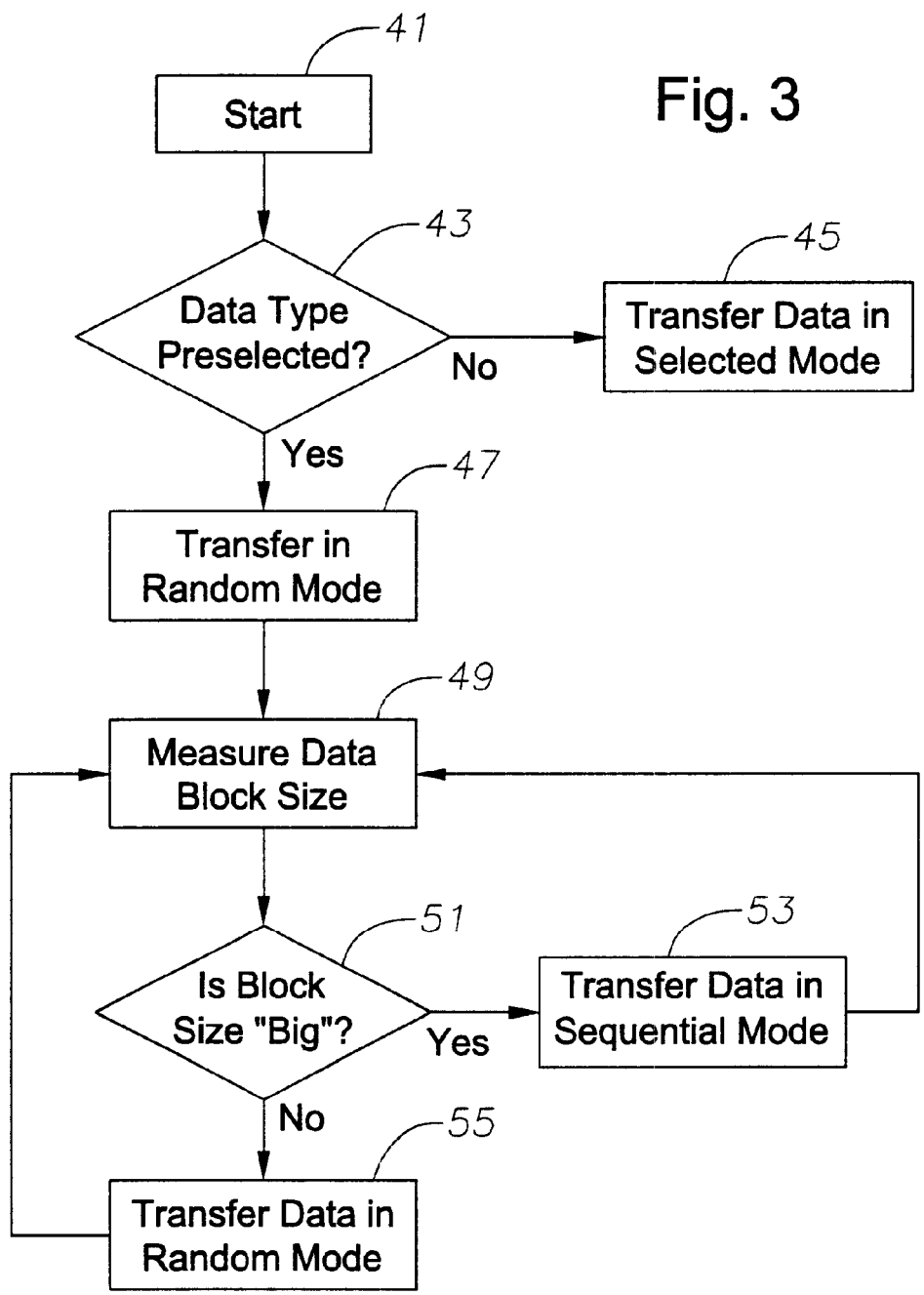
FIG. 3 is a block diagram of one embodiment of a logic circuit for selecting modes of operation in accordance with the present invention.

Referring now to FIG. 3, the sequential or random mode of operation for drive 11 can be selected in several ways. Starting at block 41, a determination is first made at block 43 as to whether the type of data is preselected. In the case when the type of data can be characterized by the user, the user sends a command as illustrated at block 45, by selecting the mode of operation best suited for each sequence of data. Alternatively, the data handling program can characterize the type of data to be written, and then select the correct mode. An example of this second alternative is depicted in block 47 wherein the data handling program has chosen to transfer the data in the random mode of operation. As a third alternative, the type of data can be characterized on the fly in real time (illustrated in block 49). As depicted in block 51, the size of the block of data is determined so that the mode of operation may be modified as the character of the data changes over time, whether sequential (block 53) or random (block 55).

This proposed solution has many features. The tracking format of actuators 21 can be configured such that the next logical track is physically located under a head on a different actuator 21. In this configuration, the track-to-track head skew could be extremely small since the head is already on track for the next actuator 21 having seeked there during the data access of the other actuator 21. In the prior art, each data track has a beginning, marked by specially-coded bits called an index mark. For the case where data spans more than one track, the HDD must switch to a new or target head or a new track to complete the reading or writing of the remaining part of the data. In order to allow time for the movement of the head, the index marks for the different heads are delayed in time by an offset in the angular direction. This is commonly called head skew. The amount of head skew is adjusted to allow the head switch or track switch to complete before the index mark on the target head or track appears. Excessive head skew hurts performance, since the data transfer must stop until the index mark appears under the target head.

However, with the multiple actuators of the present invention, the next head can be pre-positioned over the target track, thus reducing the head skew and improving performance. Compared to conventional, prior art head skew, this feature improves the sequential operation by approximately 10%. Moreover, with increasing track density in modern disk drives, the improvement will be even larger. This configuration can also be selected on a transfer-by-transfer basis by the user as described above.

The actuators 21 also may be utilized in a dual-channel configuration or environment wherein they operate independently from each other. In the dual-channel configuration, data can be written to both actuators at the same time, or data also can be read back at the same time to improve throughput. In either of these two options, the dual-channel configuration can be selected on a transfer-by-transfer basis by the user.

Figure 4:
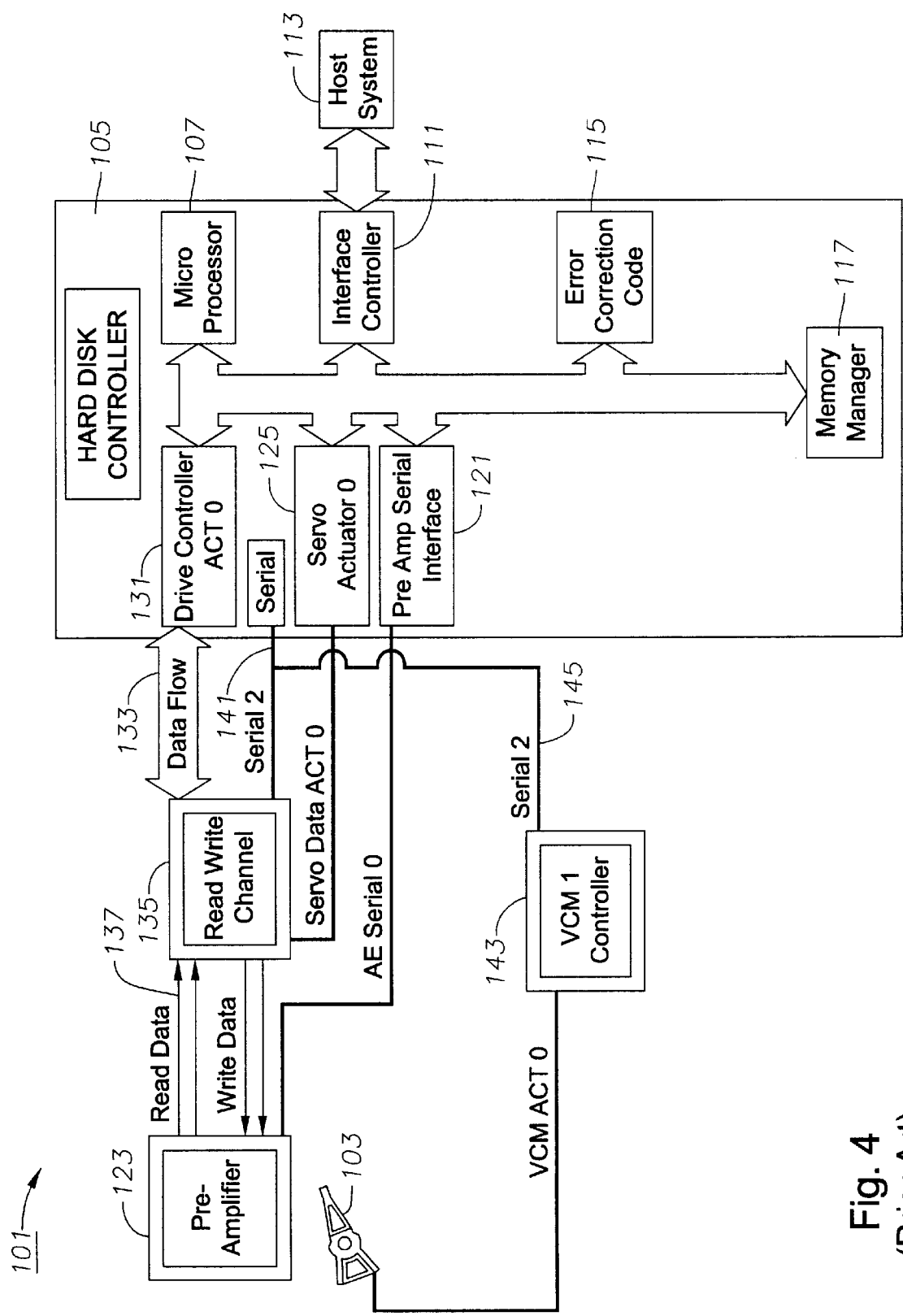
FIG. 4 is a schematic drawing of a prior art hard disk drive having a single actuator.

Alternatively, the tracking format of drive 11 can be configured such that the two actuators 21 are treated as two separate volumes or independent logical units. As a reference, the prior art, schematic drawing of FIG. 4 depicts a hard disk drive 101 having a single actuator 103 for reading and writing data to a disk. Drive 101 has a controller 105 with a general purpose computer microprocessor 107 that controls the entire disk drive 101. The interface controller 111 is a specialized chip, specific to the type of interface used (e.g., SCSI, IDE, etc.), that handles the protocol of communication with the host system 113. The error correction code module 115 directs the activities that are necessary when an error is detected in the readback of the data from the head on actuator 103. The memory manager 117 controls the memory on the electronics board that is used as a buffer during read or write operations. The pre-amp serial interface 121 communicates with the pre-amplifier 123. The servo module 125 generates the signals to accurately move and position the voice coil motor of actuator 103. The drive controller 131 moves customer data 133 to and from the read-write channel 135.

The read-write channel 135 decodes the signals 137 that are sent to it by the pre-amp 123, and also encodes data 133 sent to it by the hard disk controller 105. In addition, read-write channel 135 is controlled by the serial line 141, and has the added function of separating out the servo position data (which is interspersed with the customer data) and sending it to the servo sub-block 125 of drive controller 105. The pre-amp 123 is used to boost the level of the low level signals from the read head, so they can be transmitted to read-write channel 135 on the main electronics card. Pre-amp 123 also accepts signals from read-write channel 135 and writes data on the disk. The VCM controller 143 accepts signals via the serial line 145 and generates control currents to move actuator 103 via the voice coil motor.

However, for the multiple actuator HDD 11 of the present invention (two actuators 21 shown in FIG. 5), the pre-amplifiers 61, read-write channels 63, and VCM drivers or controllers 35 are of necessity replicated for each actuator 21. In addition, the corresponding sub-blocks within the disk controller 143 are replicated as required (e.g., the serial interfaces 71, drive controllers 73, and servo blocks 75). Alternatively, a single channel 63 can be shared between all actuators 21. The number of channels 63 implemented can be chosen on a tradeoff basis between cost and performance. When there are multiple channels 63, the logical unit or controller 143 can choose to handle the multiple channels in parallel to increase data throughput for a single data stream. This choice would maximize the data rate for a single sequential data stream. Alternatively, for multiple data streams, each of the multiple logical units (implemented in software) can control its own channel 63, each of which is connected to a separate actuator 21. This choice would be best for random data, where the data need to be read or written from random positions in the HDD.

For the present invention, the choice of one logical unit (parallel operation) or multiple logical units (independent operation) can be made in real time or selected by the user, according to the current nature of the data. Operating the drives as separate logical units improves the input/output capability in the queued environment. In addition, part of drive 11 can be configured to stream the data, and the other part of drive 11 can be configured as separate logical units. Furthermore, in a single DASD, the user can optimize drive 11 for different applications. That is, when drive 11 has more than two actuators 21, a subset of the actuators 21 can be operated in the parallel mode and the remaining the actuators 21 can be operated in independent mode. In this way, the operation of drive 11 can be optimized for the particular mix of data in use at any time.

The invention has several advantages. When the tracking format of the actuators is configured such that the next logical track is physically located under a head on a different actuator, the sequential operation is improved by about 10% over the prior art. This improvement is likely to be even larger with the increasing track density of newer disk drives. In the dual-channel configuration, data can be written to both actuators at the same time, or read back at the same time to improve throughput. The input/output capability in the queued environment can be improved by configuring the actuators as separate volumes. The head switch time between the actuators of the present invention is substantially negligible. Finally, any of these configurations can be selected on a transfer-by-transfer basis by the user to further optimize performance of the drive.

While the invention has been shown or described in only some of its forms, it should be apparent to those skilled in the art that it is not so limited, but is susceptible to various changes without departing from the scope of the invention.

In the claims:

1. A method of configuring operations of a disk drive to support different modes of data processing therein, comprising:
   (a) providing a disk drive having disks rotatably mounted thereto, and a plurality of actuators movably mounted to the disk drive for processing data via head gimbal assemblies by reading data from and writing data to the disks;
   (b) characterizing a type of data to be processed by the disk drive as either a single continuous stream of data or as separate streams of data;
   (c) operating the disk drive in a sequential mode wherein the single continuous stream of data is divided among at least two of the actuators to process the single continuous stream of data such that the actuators function as a single logical unit;
   (d) operating the disk drive in an independent mode wherein the separate streams of data are processed by at least two of the actuators independently of each other such that the actuators function as a plurality of independent logical units; and
   (e) selectively changing the disk drive to operate in either the sequential mode or in the independent mode based on an outcome of step (b) in order to configure operations of the actuators to support the different methods of data access required of them.

2. The method of claim 1, further comprising the step of simultaneously supporting both the sequential mode and the independent mode with the disk drive, such that a subset of the actuators are operated in the sequential mode at the same time that other ones of the actuators are operated in the independent mode.

3. The method of claim 1 wherein, in step (b), the type of data is characterized on the fly in real time, such that a size of the data is determined and, in step (e), the mode of operation may be modified as the character of the data changes over time.

4. The method of claim 1 wherein step (c) comprises sharing a single channel between all of said at least two of the actuators.

5. The method of claim 1 wherein step (b) is performed by a user of the disk drive such that operation of the disk drive is dictated by the user.

6. The method of claim 1 wherein step (e) is selected by a user of the disk drive such that operation of the disk drive is dictated by the user.

7. A system for configuring operations of a disk drive to support different modes of data processing within the disk drive, comprising:
   a disk drive having disks rotatably mounted thereto and a plurality of actuators movably mounted to the disk drive for processing data via head gimbal assemblies by reading data from and writing data to the disks;
   means for characterizing a type of data to be processed by the disk drive as either a single continuous stream of data or as separate streams of data;
   means for operating the disk drive in a sequential mnode wherein the single continuous stream of data is divided among at least two of the actuators to process the single continuous stream of data such that the actuators function as a single logical unit;
   means for operating the disk drive in an independent mode wherein the separate streams of data are processed by at least two of the actuators independently of each other such that the actuators function as a plurality of independent logical units; and
   means for selectively changing the disk drive to operate in either the sequential mode or in the independent mode in response to the means for characterizing to configure operations of the actuators to support the different methods of data access required of them.

8. The system of claim 7, wherein the means for operating the disk drive in the sequential mode and the means for operating the disk drive in the independent mode are used to simultaneously support both the sequential mode and the independent mode within the disk drive, such that a subset of the actuators are operated in the sequential mode at the same time that other ones of the actuators are operated in the independent mode.

9. A The system of claim 7 wherein the means for characterizes the type of data characterizes the data on the fly in real time such that a size of the data is determined, and the means for selectively changing the disk drive modifies the mode of operation as the character of the data changes over time.

10. The system of claim 7 wherein the means for operating the disk drive in a sequential mode shares a single channel between all of said at least two of the actuators.

11. The system of claim 7 wherein the means for characterizing the type of data is driven by user selection such that operation of the disk drive is dictated by a user.

12. The system of claim 7 wherein the means for s electively changing the disk drive is driven by user selection such that operation of the disk drive is dictated by a user.

* * * * *

UNITED STATES PATENT AND TRADEMARK OFFICE
CERTIFICATE OF CORRECTION

PATENT NO.    : 6,563,657 B1
DATED         : May 13, 2003
INVENTOR(S)   : Serrano et al.

It is certified that error appears in the above-identified patent and that said Letters Patent is hereby corrected as shown below:

Column 6,
Line 46, please replace the word "mnode" with the word -- mode --.

Column 7,
Line 7, please replace the word "characterizes" (1$^{st}$ occurrence) with the word -- characterizing --.

Signed and Sealed this

Ninth Day of September, 2003

JAMES E. ROGAN
*Director of the United States Patent and Trademark Office*